United States Patent Office 3,403,190
Patented Sept. 24, 1968

3,403,190
STABILIZED HALOGENATED HYDROCARBON
COMPOSITIONS OF MATTER
Germano Patron, Venice, Italy, assignor to Montecatini
Edison S.p.A., Milan, Italy
No Drawing. Filed Nov. 15, 1965, Ser. No. 507,710
Claims priority, application Italy, Nov. 18, 1964,
24,693/64
9 Claims. (Cl. 260—652.5)

ABSTRACT OF THE DISCLOSURE

A stable composition of matter comprising a hologenated hydrocarbon and a dialkylhydrazone or crotonaldehyde.

The present invention relates to the stabilization of halogenated hydrocarbons. More particularly, it relates to the stablization against decomposition of chlorinated hydrocarbons such as trichloroethylene, which hydrocarbons are conventionally used as solvents in various industrial processes.

As is already well known, chlorinated hydrocarbons, and particularly trichloroethylene and perchloroethylene, are widely used in many different technical processes, mainly as solvents for fats and other organic substances, for example, in the degreasing of metals, in the extraction of oils and fats, in the drycleaning of fabrics, etc.

Owing to the effects of heat, oxygen, light and water, these chlorinated hydrocarbons tend to decompose, and form acid products such as hydrochloric acid, toxic products such as phosgene, tarry substances and the like. These decomposition products cause serious problems both during storage and during transportation, as well as during their use and during recovery operation of the said solvents themselves.

Furthermore, this decomposition is accelerated by the presence of metals or metal salts, as well as by the direct and indirect products of the decomposition itself, and it is autocatalytic.

The aforesaid disadvantages are particularly serious in regards the degreasing of metals, and in particular of metals containing iron or aluminum, where, because of the severe conditions to which the solvent is subjected via the prolonged action of heat, oxygen humidity, and of the metal itself, there is effected a considerable decomposition of solvent.

This decomposition is itself accelerated by the chlorides which form pursuant to the action of the hydrochloric acid which is liberated on the metal. Corrosion of the metal pieces undergoing the degreasing treatment thence ensues.

It is, therefore, of basic industrial importance to prevent the decomposition of chlorinated solvents and/or to neutralize the damaging effects of decomposition products.

It is a known prior art preventative technique therefor to admix suitable stabilizers with the chlorinated solvents. Many and varied stabilizers have been suggested, particularly antioxidants, i.e., compounds that inhibit the oxidizing action of air or of acid absorbing substances intended to neutralize the acidity that gradually forms, thereby hindering the autocatalytic decomposition reactions.

The stabilizing system must, furthermore, be such as to ensure the neutrality of the solvent, even under the most severe conditions (the alkalinity of the solvent effected by strongly basic stabilizers is just as damaging as the acidity, which makes it wholly unsuitable for the degreasing of amphoteric metals such as aluminum and zinc), and it must likewise develop lasting stabilizing action, both in the liquid phase as well as in the vapor phase of the degreasing process.

Most of the stabilizing agents heretofore known in the art lack the aforesaid desirable characteristics, and thus are wholly inadequate insofar as ensuring effective and permanent stabilization of chlorinated solvents is concerned.

Accordingly, it is an object of this invention to provide a new and effective stabilizing system for halogenated hydrocarbons, particularly chlorinated solvents to be used in the degreasing of metals. This new system not only develops effective and permanent antioxidizing action, i.e., such as to ensure the inhibition of the formation of phosgene and hydrochloric acid, but also guarantees the neutrality of the solvent, even under the most severe conditions.

In our U.S. Patent 3,000,977 the stabilizing action of certain hydrazine derivatives is demonstrated, such as the alkylhydrazines, particularly the N,N-dialkylsubstituted hydrazines and the products originating from the condensation of aldehydes and ketones with hydrazines, singularly, or in combination with other compounds.

It has now been found, according to this invention, that among the hydrazinic derivatives particularly effective in the stabilization of halogenated hydrocarbons there are the dialkylhydrazones of crotonaldehyde.

It has now been found that compounds of the following general formula:

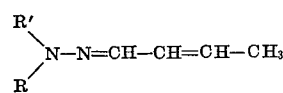

wherein R and R' are the same or different and represent alkyl groups of from 1 to 3 carbon atoms, and which are prepared by condensing N,N-dialkylhydrazines with crotonaldehyde, display a very low basic character, such as to eliminate problems in regards the degreasing of amphoteric metals. Concerning their oxidative properties, this makes them particularly suitable as antioxidants for halogenated hydrocarbons, particularly trichloroethylene.

In point of fact, the presence of the double bond connected to the hydrazinic bond renders the aforesaid compounds, with respect to oxygen and for purposes of the stabilization of the halogenated solvents, particularly suitable and of balanced stability (a stability neither too high in order to avoid oxidizing the solvent in preference to stabilizer, nor too low in order to avoid an excessively rapid diminution in effectiveness of the stabilizer system), such as to ensure a lasting stabilizing action of chlorinated solvent, even under the most severe conditions.

In particular, the dimethylhydrazone of crotonaldehyde proved to be of great effectiveness, particularly in regards the stabilization of trichloroethylene; in fact, it develops on effective and permanent antioxidizing action, far better than that of the hydrazones of other saturated or unsaturated aldehydes or ketones, even when the solvent is subjected to severe conditions inasmuch as its oxidation potential is particularly balanced with regard to the stabilization of trichloroethylene, i.e., interior to the potential of trichloroethylene by only that much which will be sufficient to ensure an oxygen oxidation of stabilizer, in preference to trichloroethylene, but not so readily as to entail a rapid exhaustion of stabilizer in the system.

According to the present invention, the amount of stabilizer to be added to the halogenated solvent obviously depends on the type of solvent to be stabilized, on the use for which the solvent is foreseen, on the required degree of stabilization and on the possible presence of other additives.

In general, concentrations are used varying between 0.001% and 0.1% by weight, and preferably between 0.005 and 0.05% with respect to the solvent to be stabilized; greater quantities may be used but are not necessary.

For different modes of application it may be convenient to use the hydrazones of this invention in combination with other stabilizers, e.g., amines, phenols, epoxides, alcohols, hydrocarbons, etc.

A stabilizer system of exceptional effectiveness for trichloroethylene is a mixture of the dimethylhydrazone of crotonaldehyde in quantities varying from 0.001% to 0.1%, and preferably from 0.005% to 0.05% by weight with respect to trichloroethylene, an epoxy such as butylene oxide, propylene oxide, amylene oxide, chloropropylene oxide and mixtures thereof in quantities varying from 0.01 to 1.0%, and preferably from 0.1 to 0.3%, and a phenol such as thymol, phenol, nitrophenol, eugenol, isopropyl-p-hydroxyanisole, p-tert-amyl- or butyl-phenol, hydroquinonemonomethylether in quantities varying from 0.001% to 0.05% and preferably from 0.001% to 0.01% by weight.

Trichloroethylene stabilized according to this invention does not exhibit any tendency to decompose, either during storage or during use under the most severe conditions, e.g., in the degreasing of metals and in recovery and regeneration operations by distillation of the solvent used. The stabilizer according to this invention displays its stabilizing action on the solvent both in the liquid phase, as well as in the vapor phase in degreasing operations, and, in general, when it is subjected to distillation, and is recoverable, together with the solvent during the regeneration operation of the same.

Even after prolonged technical processing the trichloroethylene remains clear.

Other than trichloroethylene and perchloroethylene, various other halogenated hydrocarbons may be protected against decomposition by the stabilizers of this invention, e.g., chloroform, methylchloroform, methylene chloride, carbon tetrachloride, dichloroethylene, trichloroethane, vinylidene chloride, vinylchloride, and the like.

To illustrate further the present invention and the advantages thereof, the following specific examples are given, it being understood that these are merely intended to be illustrative and not limitative.

Example 1

Two 200 ml. samples of trichloroethylene, one not stabilized and the other stabilized with 0.001% by weight of the dimethylhydrazone of crotonaldehyde, were boiled individually in 500 ml. flasks with reflux coolers in the presence of 0.5 gram of aluminum powder.

After 24 hours of reflux boiling, the pH of each of the aqueous extracts of the two trichloroethylene samples was determined.

The aqueous extract was obtained by stirring 50 ml. of distilled neutral water and 50 ml. of the trichloroethylene under examination in a separatory funnel and then separating the aqueous phase from that of the trichloroethylene.

The results are recorded in Table I.

TABLE 1

| Samples | Stabilizer added | pH of trichloroethylene | |
|---|---|---|---|
| | | At start | After test |
| 1 | None | 7 | 2.3 |
| 2 | Dimethylhydrazone of crotonaldehyde 0.01%. | 7 | 7 |

Example 2

Samples of trichloroethylene, stabilized with the stabilizers and the quantities thereof recorded in Table II, were evaluated for their stability characteristics on the basis of the accelerated oxidation test specified in the rules of the USA Army-Navy Aeronautical Specification MIL-T7003 and Federal Specification OT-634/a.

This stability test consists in reflux boiling 200 ml. of trichloroethylene, mixed with the indicated quantities of stabilizer, for 48 hours in a 500 ml. flask, bubbling some water-saturated oxygen through it via a glass tube of 3 mm. $\phi$ at a rate of 10–12 bubbles per minute; a small steel plate of $\frac{1}{2}''$ x $2''$ x $\frac{1}{16}''$ was suspended in the vapor phase and another small steel plate of $\frac{1}{4}''$ x $\frac{3}{4}''$ x $\frac{1}{16}''$ was introduced into the liquid phase. As a light and heat source, a frosted 150 watt bulb was placed under the flask.

At the end of the test, the acidity of the trichloroethylene was determined by measuring the pH of the aqueous extracts, using, in all cases, the same water/trichloroethylene ratio (1:1), and the aspect of the steel plates and the trichloroethylene were then examined.

The results are recorded in Table II, wherein the percentages by weight of the different additives are given with respect to trichloroethylene. Tests 2, 3, 4, 8 and 9 are given for comparison.

TABLE II

| Example No. | Stabilizers | pH of the aqueous extract, before the oxidizing test | pH of the aqueous extract after the oxidizing test | Phosgene | Color of trichloroethylene | Condition of the small plate in the vapor phase |
|---|---|---|---|---|---|---|
| 1 | Dimethylhydrazone of crotonaldehyde 0.025%. | 7 | 7 | Absent | Clear | Dull-uncorroded. |
| 2 | Dimethylhydrazone of acrolein 0.025%. | 7 | 1-2 | Saturated | Brown | Corroded and covered with tarry substances. |
| 3 | Butylene oxide 0.20%, propylene oxide 0.05%, thymol 0.002%. | 7 | 1-2 | do | Slightly yellow | Very corroded. |
| 4 | Dimethylhydrazone of crotonaldehyde 0.025%, butylene oxide 0.20%, propylene oxide 0.05%, thymol 0.002%. | 7 | 7 | Absent | Clear | |
| 5 | Dimethylhydrazone of crotonaldehyde 0.025%, butylene oxide 0.25%, p-tert amyl-phenol 0.002%. | 7 | 7 | do | do | Perfectly polished and absolutely uncorroded. |
| 6 | Dimethylhydrazone of crotonaldehyde 0.025%, butylene oxide 0.20%, propylene oxide 0.05%, hydroquinone-monomethylether 0.002%. | 7 | 7 | Absent | | Perfectly bright and absolutely uncorroded. |
| 7 | Dimethylhydrazone of acrolein 0.025%, butylene oxide 0.20%, propylene oxide 0.05%, thymol 0.002%. | 7 | 1.5-2.5 | Saturated | | Corroded and covered with tarry substances. |
| 8 | Dimethylhydrazone of methylvinyl-ketone 0.025%, butylene oxide 0.20%, propylene oxide 0.05%, thymol 0.002%. | 7 | 2-3 | do | | Do. |

From the above recorded test, it is readily apparent how effective the stabilization of trichloroethylene is when operating according to this invention. In fact, the pH remains neutral, phosgene is completely absent, and the aspect of steel plates and trichloroethylene is wholly satisfactory, even after the severe conditions of the oxidation test.

Example 9

3 samples of perchloroethylene each of 250 ml., one of which unstabilized the other two stabilized respectively with 0.025% by weight of dimethylhydrazone of the crotonaldehyde and with 0.025% by weight of diethylhydrazone of the crotonaldehyde, 0.20% by weight of butylene oxide, 0.050% by weight of propylene oxide and 0.002% by weight of thymol (the percentage being referred to the solvent to be stabilized) were boiled in flasks of 500 ml. fitted with reflux coolers, in the presence of a copper plate (18 x 100 x 1 mm.) immersed partly into the liquid phase and partly into the vapour phase.

After 24 hours of reflux boiling, the pH's of the aqueous extracts of the three samples were determined. Each aqueous extract is obtained by agitating in a separator funnel 50 ml. of distilled neutral water and 50 ml. of the perchloroethylene under examination, thereupon separating the aqueous phase from that of the perchloroethylene.

The pH's showed a value of: 3 for the unstabilized sample and 7 for the other two stabilized samples.

As many apparently widely different embodiments of this invention can be made without departing from the spirit and scope thereof, it is to be understood that this invention is not to be limited to the specific embodiments thereof except as defined in the appended claims.

What is claimed is:

1. A stable composition of matter comprising a liquid aliphatic halogenated hydrocarbon and a stabilizing amount of the hydrazone of the formula:

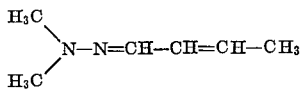

2. The stable composition of matter as defined by claim 1, wherein the liquid aliphatic halogenated hydrocarbon is selected from the group consisting of trichloroethylene, perchloroethylene, chloroform, methylchloroform, methylene chloride, carbon tetrachloride, dichloroethylene, trichloroethane, vinylidene chloride, vinyl chloride and mixtures thereof.

3. The stable composition of matter as defined by claim 1, wherein the liquid aliphatic halogenated hydrocarbon is selected from the group consisting of trichloroethylene and perchloroethylene, and the hydrazone is present in an amount of from between 0.001% and 0.1% by weight thereof.

4. The stable composition of matter as defined by claim 3, wherein the liquid aliphatic halogenated hydrocarbon is trichloroethylene, and the hydrazone is present in an amount of from between 0.005% and 0.05% by weight trichloroethylene.

5. The stable composition of matter as defined by claim 2, wherein there is additionally present a stabilizing amount of an organic epoxy compound selected from the group consisting of butylene oxide, propylene oxide, amylene oxide, chloropropylene oxide and mixtures thereof, and a stabilizing amount of an organic phenol selected from the group consisting of thymol, phenol, nitrophenol, eugenol, isopropyl-p-hydroxyanisole, p-tert-amyl-phenol, p-tert-butyl-phenol, hydroquinonemonomethylether and mixtures thereof.

6. The stable composition of matter as defined by claim 5, wherein the organic epoxy compound is present in an amount of from between 0.01% and 1.0% by weight of the liquid aliphatic halogenated hydrocarbon, and the organic phenol is present in an amount of from between 0.001% and 0.05% by weight of the liquid aliphatic halogenated hydrocarbon.

7. The stable composition of matter as defined by claim 6, wherein the organic epoxy compound is present in an amount of from between 0.1% and 0.3% by weight of the liquid aliphatic halogenated hydrocarbon, and the organic phenol is present in an amount of from between 0.001% and 0.01% by weight of the liquid aliphatic halogenated hydrocarbon.

8. The stable composition of matter as defined by claim 4, wherein there is additionally present from between 0.01% and 1.0% by weight of the trichloroethylene of an organic epoxy compound selected from the group consisting of butylene oxide, propylene oxide, amylene oxide, chloropropylene oxide and mixtures thereof, and from between 0.001% and 0.05% by weight of the trichloroethylene of an organic phenol selected from the group consisting of thymol, phenol, nitrophenol, eugenol, isopropyl-p-hydroxyanisole, p-tert-amyl-phenol, p-tert-butyl-phenol, hydroquinonemonomethylether and mixtures thereof.

9. The stable composition of matter as defined by claim 8, wherein the organic epoxy compound is selected from the group consisting of butylene oxide and a mixture of butylene oxide and propylene oxide and the organic phenol is selected from the group consisting of thymol, p-tert-amyl-phenol and hydroquinonemonomethylether.

References Cited

UNITED STATES PATENTS 3,043,888  7/1962  Pray et al. _____ 260—652.5

LEON ZITVER, Primary Examiner.

M. JACOB, Assistant Examiner.